(12) United States Patent
Sun

(10) Patent No.: US 11,422,827 B2
(45) Date of Patent: Aug. 23, 2022

(54) METHOD, DEVICE, APPARATUS FOR IDENTIFYING GRAPHICS CARD OF GPU SERVER AND MEDIUM

(71) Applicant: ZHENGZHOU YUNHAI INFORMATION TECHNOLOGY CO., LTD., Henan (CN)

(72) Inventor: Xiuqiang Sun, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 479 days.

(21) Appl. No.: 16/475,115

(22) PCT Filed: Dec. 25, 2018

(86) PCT No.: PCT/CN2018/123480
§ 371 (c)(1),
(2) Date: Jun. 30, 2019

(87) PCT Pub. No.: WO2019/237710
PCT Pub. Date: Dec. 19, 2019

(65) Prior Publication Data
US 2021/0357235 A1 Nov. 18, 2021

(30) Foreign Application Priority Data
Jun. 11, 2018 (CN) .......................... 201810594754.2

(51) Int. Cl.
*G06F 9/4401* (2018.01)
*G06F 13/10* (2006.01)

(52) U.S. Cl.
CPC .......... *G06F 9/4411* (2013.01); *G06F 13/102* (2013.01); *G06F 2213/40* (2013.01)

(58) Field of Classification Search
CPC ................. G06F 9/4411; G06F 13/102; G06F 2213/0024; G06F 2213/40
See application file for complete search history.

(56) References Cited

U.S. PATENT DOCUMENTS

2014/0195697 A1   7/2014   Chen
2015/0042664 A1*  2/2015   Currid ....................... G06F 9/46
                                                            345/502
(Continued)

FOREIGN PATENT DOCUMENTS

CN   201527597 U    7/2010
CN   102799407 A   11/2012
(Continued)

OTHER PUBLICATIONS

Kristie D'Ambrosio and Dr. Ron Pirich, Northrop Grumman Aerospace Systems,Senior Member, IEEE,MoM Software for GPU Hardware,2011 IEEE Long Island Systems, Applications and Technology Conference,Jun. 7, 2011.
(Continued)

*Primary Examiner* — Glenn A. Auve
(74) *Attorney, Agent, or Firm* — Yue (Robert) Xu; Apex Attorneys at Law, LLP

(57) ABSTRACT

A method, a device, an apparatus for identifying a graphics card of a GPU server, and a medium are provided. The method includes: obtaining correlation information of a graphics card captured by an operation of enumerating PCI devices during a startup process of running a BIOS; determining whether the graphics card belongs to a preset category; reading a memory address of the graphics card in a configuration space of the PCI device in a case that the graphics card belongs to the preset category, and obtaining an actual memory address based on the memory address and an offset; and resetting the graphics card based on the actual (Continued)

memory address, and sending a restart instruction to perform a restart operation.

10 Claims, 3 Drawing Sheets

(56) References Cited

U.S. PATENT DOCUMENTS

2017/0091981 A1  3/2017  Herr et al.
2017/0337151 A1  11/2017  Sivertsen et al.

FOREIGN PATENT DOCUMENTS

| CN | 103150188 A | 6/2013 |
|---|---|---|
| CN | 104360860 A | 2/2015 |
| CN | 104850203 A | 8/2015 |
| CN | 106155689 A | 11/2016 |
| CN | 107025401 A | 8/2017 |
| CN | 108776595 A | 11/2018 |

OTHER PUBLICATIONS

Rong Kui,Research and Implementation of a Real-Time Embedded Graphics System based on Asynchronous Communication Control Strategy,China Master's Theses Full-text Database(Electronic journals) Information Technology Series,Issue 6, 2014,Jun. 15, 2014.
Liu Gaoming, Rong Kui, Zhu Hui, et al. Design of graphics display system for embedded RTOS. Computer Engineering and Applications, 2016,52(9),May 15, 2016,pp. 190-195.
Tian Ming, New GPU-Z for laptop graphics card physique check, PC Digest Magazine, No. 6, 2012, Mar. 31, 2012, pp. 80-81.
International Search Report for PCT/CN2018/123480 dated Apr. 8, 2019, ISA/CN.

* cited by examiner

METHOD, DEVICE, APPARATUS FOR IDENTIFYING GRAPHICS CARD OF GPU SERVER AND MEDIUM

The present application is a National phase application of PCT international patent application PCT/CN2018/123480, filed on Dec. 25, 2018 which claims the priority to Chinese Patent Application No. 201810594754.2, titled "METHOD, DEVICE, APPARATUS FOR IDENTIFYING GRAPHICS CARD OF GPU SERVER AND MEDIUM", filed on Jun. 11, 2018 with the Chinese Patent Office, both-of which are incorporated herein by reference in their entireties.

TECHNICAL FIELD

The present disclosure relates to the field of computing of a GPU server, and in particular to a method, a device, an apparatus for identifying a graphics card of a GPU server, and a medium.

BACKGROUND

Compared with a traditional server, a GPU server has better computing and processing capability, and is widely used in fields requiring high computing and processing capability, such as artificial intelligence. A graphics card is one important component in the GPU server. Some of the existing graphics cards are good in performance but high in price. Therefore, a low-price graphics card is widely applied for most enterprises.

When applied to the GPU server, some graphics cards fail to be identified under particular circumstances (generally when the GPU server is restarted), for example, an AMD MI25 graphics card.

Apparently, functions of a graphics card cannot be achieved normally if the graphics card cannot be identified. Therefore, it is a problem to be urgently solved by those skilled in the art that how to ensure a graphics card be identified normally after the GPU server is restarted.

SUMMARY

In view of the above, the present disclosure aims to provide a method, a device, an apparatus for identifying a graphics card of a GPU server, and a medium, to ensure that the graphics card is identified normally after the GPU server is restarted.

To solve the above technical problems, a method for identifying a graphics card of a GPU server is provided according to the present disclosure. The method includes:

obtaining correlation information of a graphics card captured by an operation of enumerating PCI devices during a startup process of running a BIOS;

determining whether the graphics card belongs to a preset category based on the correlation information;

reading a memory address of the graphics card in a configuration space of the PCI device in a case that the graphics card belongs to the preset category, and obtaining an actual memory address based on the memory address and an offset of the graphics card in a previous work cycle; and resetting the graphics card based on the actual memory address, and sending a restart instruction to perform a restart operation.

Preferably, the correlation information includes version ID information and ID information of the PCI device, and the determining whether the graphics card belongs to a preset category based on the correlation information includes:

determining whether both the version ID information and the ID information of the PCI device correspond to ID information of the graphics card, and determining that the graphics card belongs to the preset category in a case that both the version ID information and the ID information of the PCI device correspond to the ID information of the graphics card.

Preferably, the method further includes: performing a sequential operation on the graphics card and accessing an operating system normally, in a case that the graphics card does not belong to the preset category.

Preferably, the reading a memory address of the graphics card in a configuration space of the PCI device includes: reading a memory address of a BARS register of the graphics card in the configuration space of the PCI device.

Preferably, the number of the graphics card is 8 or 16.

Preferably, the preset category of the graphics card is AMD MI25.

In order to solve the above technical problem, a device for identifying a graphics card of a GPU server is further provided according to the present disclosure. The device includes: an obtaining unit, a determining unit, a reading unit and a resetting unit.

The obtaining unit is configured to obtain correlation information of a graphics card captured by an operation of enumerating PCI devices during a startup process of running a BIOS.

The determining unit is configured to determine whether the graphics card belongs to a preset category based on the correlation information.

The reading unit is configured to read a memory address of the graphics card in a configuration space of the PCI device in a case that the determining unit determines that the graphics card belongs to the preset category, and obtain an actual memory address based on the memory address and an offset of the graphics card in a previous work cycle.

The resetting unit is configured to reset the graphics card based on the actual memory address, and send a restart instruction to perform a restart operation.

Preferably, the correlation information includes version ID information and ID information of the PCI device, and the determining unit is configured to:

determine whether both the version ID information and the ID information of the PCI device correspond to ID information of the graphics card, and determine that the graphics card belongs to the preset category in a case that both the version ID information and the ID information of the PCI device correspond to the ID information of the graphics card.

In order to solve the above technical problem, an apparatus for identifying a graphics card of a GPU server is further provided according to the present disclosure. The apparatus includes a memory and a processor.

The memory is configured to store a computer program. The processor is configured to execute the computer program to implement the method for identifying a graphics card of a GPU server described above.

In order to solve the above technical problem, a computer readable storage medium is further provided according to the present disclosure. The computer readable storage medium stores a computer program, and the method for identifying a graphics card of a GPU server described above is implemented when the computer program is executed by a processor.

According to the method for identifying a graphics card of a GPU server provided by the present disclosure, during a startup process of running a BIOS, correlation information of a graphics card captured by an operation of enumerating PCI devices is obtained. It is determined whether the graphics card belongs to a preset category based on the correlation information. A memory address of the graphics card in a configuration space of the PCI device is read in a case that the graphics card belongs to the preset category, and an actual memory address is obtained based on the memory address and an offset of the graphics card in a previous work cycle. The graphics card is reset based on the actual memory address, and a restart instruction is sent to perform a restart operation. It follows that, in the method, the actual memory address of the graphics card is obtained based on the memory address in the configuration space of the PCI device and the offset of the graphics card in the previous work cycle. The graphics card is reset based on the actual memory address. The graphics card is in a non-working state after it is reset. The memory of the graphics card is released after restarting the server, and thus the graphics card can be identified and used normally. Compared with the conventional technology, the method according to the present disclosure has at least following advantages. A low-cost graphics card can be applied in the method, thereby reducing the dependence on a high-cost graphics card and reducing a purchasing cost.

Besides, the device, apparatus for identifying a graphics card of a GPU server, and the medium provided by the present disclosure all have the beneficial effects described above.

BRIEF DESCRIPTION OF THE DRAWINGS

In order to explain the embodiments of the present disclosure clearer, the accompanying drawings to be used in description of the embodiments are introduced briefly hereinafter. Apparently, the drawings described below show only some embodiments of the present disclosure, and for those skilled in the art, other drawings can also be obtained from these drawings without any creative effort.

DETAILED DESCRIPTION OF THE EMBODIMENTS

The technical solutions in the embodiments of the present disclosure are described clearly and completely below with reference to the accompanying drawings in the embodiments of the present disclosure. Apparently, the described embodiments are only some rather than all of the embodiments of the present disclosure. Based on the embodiments of the present disclosure, all other embodiments obtained by those skilled in the art without any creative effort fall within the protection scope of the present disclosure.

It is provided a method, a device, an apparatus for identifying a graphics card of a GPU server, and a medium according to the present disclosure, to ensure that the graphics card can be identified normally after the GPU server is restarted.

In order to make those skilled in the art better understand the technical solutions of the present disclosure, the present disclosure is described in detail with reference to the drawings and specific embodiments hereinafter.

Figure 1:
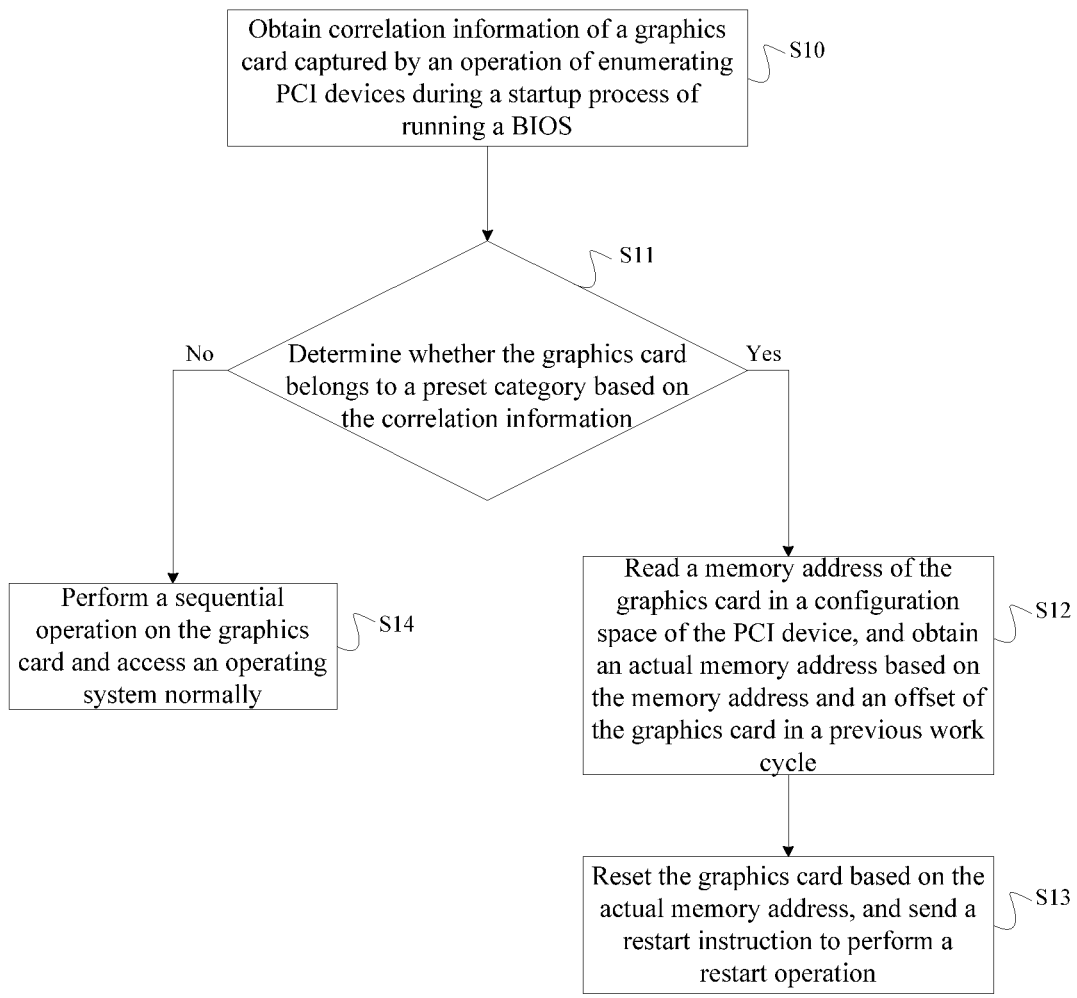
FIG. 1 is a flowchart of a method for identifying a graphics card of a GPU server according to an embodiment of the present disclosure.

FIG. 1 is a flowchart of a method for identifying a graphics card of a GPU server according to an embodiment of the present disclosure. As shown in FIG. 1, the method includes the following steps S10 to S14.

In step S10, correlation information of a graphics card captured by an operation of enumerating PCI devices is obtained during a startup process of running a BIOS.

It should be noted that, BIOS indicates a group of programs cured in a ROM chip on a motherboard of a computer or a server. The BIOS includes the most important basic input/output programs, self-checking programs after startup and system self-starting programs of the computer or the server. Therefore, the main function of the BIOS is to provide underlying hardware setup and control approach for the computer or the server. A type of the graphics card in the present disclosure is not limited. For example, an AMD MI25 graphics card may be applied.

When starting the server, BIOS is executed. During the process, the routine operation includes an operation of enumerating PCI devices, that is, each PCI device (the graphics card is included) in a system is screened based on some filtering conditions. For different operating systems, the enumeration methods are different. For example, unlike a Windows system, a Linux system does not have a function for enumerating a graphics card, and thus information of the PCI device is obtained by means of a shell script or reading a configuration space of the PCI device. It should be understood that, the operation of enumerating PCI devices belongs to the conventional technology, and is well known by those skilled in the art, which is not described in detail herein.

In step S11, it is determined whether the graphics card belongs to a preset category based on the correlation information; step S12 is executed in a case that the graphics card belongs to the preset category, and step S14 is executed in a case that the graphics card does not belong to the preset category.

In implementations, not all graphics cards fail to be identified after the server is restarted. In this step, it is determined whether the graphics card belongs to a preset category based on the correlation information. It should be understood that, the graphics card of the preset category does not refer to a specific type of graphics card, and may include multiple kinds of graphics cards, for example, an AMD MI25 graphics card.

Preferably, the correlation information includes version ID information and ID information of the PCI device. In this case, step S11 includes:

determining whether both the version ID information and the ID information of the PCI device correspond to ID information of the graphics card, and determining that the graphics card belongs to the preset category in a case that both the version ID information and the ID information of the PCI device correspond to the ID information of the graphics card.

In step S12, a memory address of the graphics card in a configuration space of the PCI device is read, and an actual memory address is obtained based on the memory address and an offset of the graphics card in a previous work cycle.

Each graphics card has a corresponding memory address in a configuration space of a PCI device, but the memory address may generate an offset during the use process. That is, a current actual memory address of the graphics card differs from the memory address of the graphics card in the configuration space of the PCI device, and the difference is the offset. The offset is generated in a previous work cycle. Therefore, a value of the offset may be determined based on the previous work cycle.

It should be noted that, some graphics cards are not reset, that is, maintaining an operating state, when the server starts up. Those graphics cards cannot be identified after the server is restarted, and thus cannot be used normally. In this step, the actual memory address of the graphics card is determined based on the memory address of the graphics card in the configuration space of the PCI device and the offset. The actual memory address is an accurate current memory address of the graphics card.

Preferably, in step S12, the process of reading a memory address of the graphics card in a configuration space of the PCI device includes: reading a memory address of a BARS register of the graphics card in the configuration space of the PCI device.

In step S13, the graphics card is reset based on the actual memory address, and a restart instruction is sent to perform a restart operation.

The actual memory address of the graphics card is determined in step S12. In step 13, a graphics card having the actual memory address is found and reset. Then a restart instruction is sent to perform a restart operation. It should be understood that, after the restart operation, the graphics card is in a non-working state and can be identified since the graphics card is reset. After the restart operation, the operation of enumerating PCI devices is still performed. An actual memory address is determined based on a memory address and an offset of the graphics card. A sequential operation is performed based on the actual memory address, and an operating system can be accessed normally after the sequential operation, thereby ensuring that the graphics card can be identified and has a normal function each time the server starts up.

Compared with the conventional technology, the method according to the present disclosure has at least following advantages. A low-cost graphics card can be used in the method, thereby reducing the dependence on a high-cost graphics card and reducing a purchasing cost.

In step S14, a sequential operation is performed on the graphics card, and an operating system is accessed normally.

It should be noted that, the operations after accessing the operating system belongs to the conventional technology. For the sequential operation, one may refer to conventional technology, and details are not described in the embodiment.

According to the method for identifying a graphics card of a GPU server provided by the present disclosure, during a startup process of running a BIOS, correlation information of a graphics card captured by an operation of enumerating PCI devices is obtained. It is determined whether the graphics card belongs to a preset category based on the correlation information. A memory address of the graphics card in a configuration space of the PCI device is read in a case that the graphics card belongs to the preset category, and an actual memory address is obtained based on the memory address and an offset of the graphics card in a previous work cycle. The graphics card is reset based on the actual memory address, and a restart instruction is sent to perform a restart operation. It follows that, in the method, the actual memory address of the graphics card is obtained based on the memory address in the configuration space of the PCI device and the offset of the graphics card in the previous work cycle. The graphics card is reset based on the actual memory address. The graphics card is in a non-working state after it is reset. The memory of the graphics card is released after restarting the server, and thus the graphics card can be identified and used normally. Compared with the conventional technology, the method according to the present disclosure has at least following advantages. A low-cost graphics card can be used in the method, thereby reducing the dependence on the high-cost graphics card and reducing the purchasing cost.

Preferably, the number of the graphics cards is 8 or 16.

It should be understood that, the number of the graphics cards is not limited. The number of graphics cards supported the GPU server is generally 8 or 16.

Figure 2:
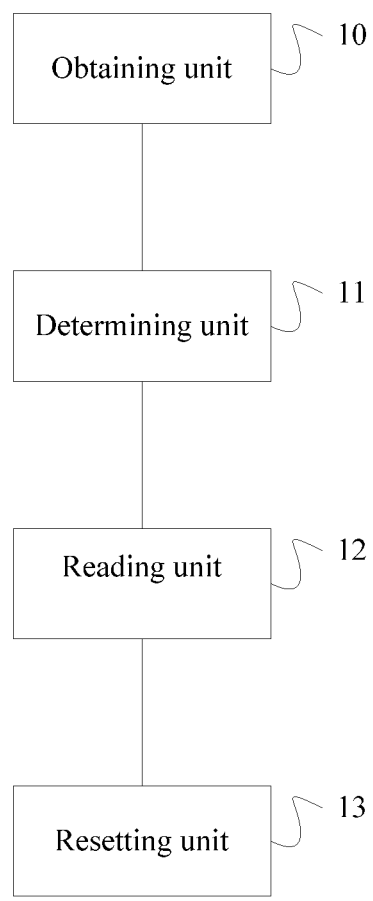
FIG. 2 is a structural diagram of a device for allocating resources based on a type of a PCI device according to an embodiment of the present disclosure.
Figure 3:
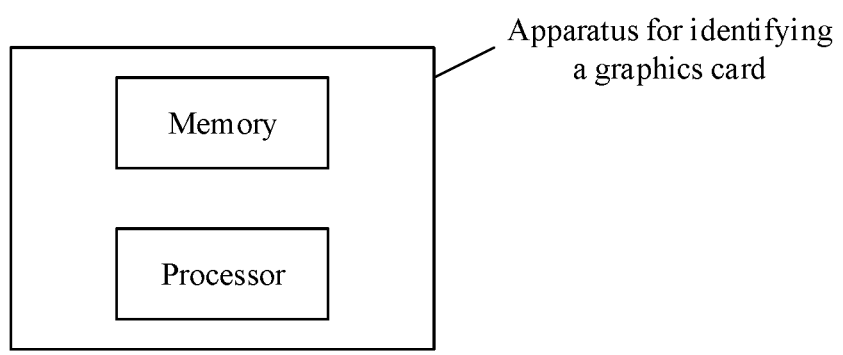
FIG. 3 is a structural diagram of an apparatus for identifying a graphics card of a GPU server according to an embodiment of the present disclosure.

Embodiments of the method for identifying a graphics card of a GPU server are described in detail above. A device corresponding to the method is further provided by the present disclosure. FIG. 2 is a structural diagram of a device for allocating resources based on a type of a PCI device according to an embodiment of the present disclosure. As shown in FIG. 2, the device includes: an obtaining unit 10, a determining unit 11, a reading unit 12 and a resetting unit 13.

The obtaining unit 10 is configured to obtain correlation information of a graphics card captured by an operation of enumerating PCI devices during a startup process of running a BIOS.

The determining unit 11 is configured to determine whether the graphics card belongs to a preset category based on the correlation information.

The reading unit 12 is configured to read a memory address of the graphics card in a configuration space of the PCI device in a case that the determining unit determines that the graphics card belongs to the preset category, and obtain an actual memory address based on the memory address and an offset of the graphics card in a previous work cycle.

The resetting unit 13 is configured to reset the graphics card based on the actual memory address, and send a restart instruction to perform a restart operation.

Preferably, the correlation information includes version ID information and ID information of the PCI device.

The determining unit 11 is configured to: determine whether both the version ID information and the ID information of the PCI device correspond to ID information of the graphics card, and determine that the graphics card belongs to the preset category in a case that both the version ID information and the ID information of the PCI device correspond to the ID information of the graphics card.

The device embodiment corresponds to the method embodiment. For the device embodiment, one may be refer to description of the method embodiments, and details are not described herein.

According to the device for identifying a graphics card of a GPU server provided by the present disclosure, during a startup process of running a BIOS, correlation information of a graphics card captured by an operation of enumerating PCI devices is obtained. It is determined whether the graphics card belongs to a preset category based on the correlation information. A memory address of the graphics card in a configuration space of the PCI device is read in a case that the graphics card belongs to the preset category, and an actual memory address is obtained based on the memory address and an offset of the graphics card in a previous work cycle. The graphics card is reset based on the actual memory address, and a restart instruction is sent to perform a restart operation. It follows that, in the device, the actual memory address of the graphics card is obtained based on the memory address in the configuration space of the PCI device and the offset of the graphics card in the previous work cycle. The graphics card is reset based on the actual memory address. The graphics card is in a non-working state after it is reset. The memory of the graphics card is released after restarting the server, and thus the graphics card can be identified and used normally. Compared with the conventional technology, the method according to the present disclosure has at least following advantages. A low-cost graphics card can be used in the method, thereby reducing the dependence on the high-cost graphics card and reducing the purchasing cost.

An apparatus for identifying a graphics card of a GPU server is further provided by the present disclosure. The apparatus for identifying a graphics card of a GPU server is described from a different angle as compared with the device for detecting a graphics card of a GPU server. The device for identifying a graphics card of a GPU server is described based on functional modules, while the apparatus for identifying a graphics card of a GPU server is described based on hardware. It should be understood that, the method above is implemented when computer programs stored in a memory are executed by a processor. The apparatus includes a memory and a processor.

The memory is configured to store a computer program.

The processor is configured to execute the computer program to implement the method for identifying a graphics card of a GPU server as described in the above embodiments.

The apparatus for identifying a graphics card of a GPU server provided by the present embodiment includes the memory and the processor. The processor can implement the following method. During a startup process of running a BIOS, correlation information of a graphics card captured by an operation of enumerating PCI devices is obtained. It is determined whether the graphics card belongs to a preset category based on the correlation information. A memory address of the graphics card in a configuration space of the PCI device is read in a case that the graphics card belongs to the preset category, and an actual memory address is obtained based on the memory address and an offset of the graphics card in a previous work cycle. The graphics card is reset based on the actual memory address, and a restart instruction is sent to perform a restart operation. It follows that, in the method, the actual memory address of the graphics card is obtained based on the memory address in the configuration space of the PCI device and the offset of the graphics card in the previous work cycle. The graphics card is reset based on the actual memory address. The graphics card is in a non-working state after it is reset. The memory of the graphics card is released after restarting the server, and thus the graphics card can be identified and used normally. Compared with the conventional technology, the method according to the present disclosure has at least following advantages. A low-cost graphics card can be used in the method, thereby reducing the dependence on the high-cost graphics card and reducing the purchasing cost.

A computer readable storage medium is further provided according to an embodiment of the present disclosure. The computer readable storage medium stores a computer program. The method for identifying a graphics card of a GPU server described in the above embodiments is implemented when the computer program is executed by the processor.

The functional units described above may be stored in a computer readable storage medium, if the functional units are implemented as functional software units and sold or applied as an independent product. Based on such understanding, the essence of the technical solutions of the present disclosure, the part of the technical solutions of the present disclosure contributing to the conventional technology, or all or a part of the technical solutions of the present disclosure may be embodied by means of software products. The software products are stored in a storage memory, and include multiple instructions to instruct a device to execute all or part of the steps of the methods as described in embodiments of the present disclosure. The storage medium includes various kinds of medium that can store a program code, such as a U disk, a mobile hard disk, a read-only memory (ROM), a random access memory (RAM), a magnetic disk, an optical disk, and etc.

The computer readable storage medium provided in the embodiment of the present disclosure is configured to implement the following method. During a start process of running a BIOS, correlation information of a graphics card captured by an operation of enumerating PCI devices is obtained. It is determined that whether the graphics card belongs to a preset category based on the correlation information. A memory address of the graphics card in a configuration space of the PCI device is read in a case that the graphics card belongs to the preset category, and an actual memory address is obtained based on the memory address and an offset of the graphics card in a previous work cycle. The graphics card is reset based on the actual memory address, and a restart instruction is sent to perform a restart operation. It follows that, in the method, the actual memory address of the graphics card is obtained based on the memory address in the configuration space of the PCI device and the offset of the graphics card in the previous work cycle. The graphics card is reset based on the actual memory address. The graphics card is in a non-working state after it is reset. The memory of the graphics card is released after restarting the server, and thus the graphics card can be identified and used normally. Compared with the conventional technology, the method according to the present disclosure has at least following advantages. A low-cost graphics card can be used in the method, thereby reducing the dependence on the high-cost graphics card and reducing the purchasing cost.

The method, device, apparatus for identifying a graphics card of a GUP server and the medium provided by the present disclosure are described in detail above. The embodiments in this specification are described in a progressive manner. Each embodiment lays emphasis on differences from other embodiments. For the same or similar parts between the embodiments, one may refer to the description of other embodiments. Since the device embodiment corresponds to the method embodiment, the description for the device embodiment is relatively simple. For related parts, reference may be made to description in the method embodiment. Various changes and modifications may be made to the present disclosure by those skilled in the art without departing from the principle of the present disclosure. The changes and modifications fall within the protection scope of claims of the present disclosure.

It should be further noted that, in the specification, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to be inclusive, so that a process, method, article or device including a series of elements includes not only those elements but also other elements which are not listed definitely, or an element(s) inherent to the process, method, article or device. Moreover, unless further defined, elements defined by "comprising a(n) . . . " do not preclude including an additional identical element(s) in a process, method, article or device comprising the defined elements.

The invention claimed is:

1. A method for identifying a graphics card of a GPU server, comprising:
   obtaining correlation information of a graphics card captured by an operation of enumerating PCI devices during a startup process of running a BIOS;
   determining whether the graphics card belongs to a preset category based on the correlation information;
   reading a memory address of the graphics card in a configuration space of the PCI device in a case that the graphics card belongs to the preset category, and obtaining an actual memory address based on the memory address and an offset of the graphics card in a previous work cycle; and
   resetting the graphics card based on the actual memory address, and sending a restart instruction to perform a restart operation.

2. The method according to claim 1, wherein the correlation information comprises version ID information and ID information of the PCI device, and the determining whether the graphics card belongs to a preset category based on the correlation information comprises:
   determining whether both the version ID information and the ID information of the PCI device correspond to ID information of the graphics card, and determining that the graphics card belongs to the preset category in a case that both the version ID information and the ID information of the PCI device correspond to the ID information of the graphics card.

3. The method according to claim 2, further comprising:
   performing a sequential operation on the graphics card and running an operating system in a case that the graphics card does not belong to the preset category.

4. The method according to claim 1, further comprising:
   performing a sequential operation on the graphics card and running an operating system in a case that the graphics card does not belong to the preset category.

5. The method according to claim 1, wherein the reading a memory address of the graphics card in a configuration space of the PCI device comprises:
   reading a memory address of a BARS register of the graphics card in the configuration space of the PCI device.

6. The method according to claim 1, wherein a number of the graphics card is 8 or 16.

7. The method according to claim 1, wherein the preset category of the graphics card is AMD MI25.

8. A device for identifying a graphics card of a GPU server, comprising:
   an obtaining unit, configured to obtain correlation information of a graphics card captured by an operation of enumerating PCI devices during a startup process of running a BIOS;
   a determining unit, configured to determine whether the graphics card belongs to a preset category based on the correlation information;
   a reading unit, configured to read a memory address of the graphics card in a configuration space of the PCI device in a case that the determining unit determines that the graphics card belongs to the preset category, and obtain an actual memory address based on the memory address and an offset of the graphics card in a previous work cycle; and
   a resetting unit, configured to reset the graphics card based on the actual memory address, and send a restart instruction to perform a restart operation.

9. The device according to claim 8, wherein the correlation information comprises version ID information and ID information of the PCI device, and the determining unit is configured to:
   determine whether both the version ID information and the ID information of the PCI device correspond to ID information of the graphics card, and determine that the graphics card belongs to the preset category in a case that both the version ID information and the ID information of the PCI device correspond to the ID information of the graphics card.

10. An apparatus for identifying a graphics card of a GPU server, comprising:
    a memory configured to store a computer program; and
    a processor configured to execute the computer program to implement-operations of:
    obtaining correlation information of a graphics card captured by an operation of enumerating PCI devices during a startup process of running a BIOS;
    determining whether the graphics card belongs to a preset category based on the correlation information;
    reading a memory address of the graphics card in a configuration space of the PCI device in a case that the graphics card belongs to the preset category, and obtaining an actual memory address based on the memory address and an offset of the graphics card in a previous work cycle; and
    resetting the graphics card based on the actual memory address, and sending a restart instruction to perform a restart operation.

* * * * *